Dec. 9, 1924.

A. BOUDREAU

HOSE WINDER CLAMP

Filed Dec. 1, 1923

1,519,018

Inventor.
ADLOR BOUDREAU
By Victor J Evans
Attorney.

Patented Dec. 9, 1924.

1,519,018

UNITED STATES PATENT OFFICE.

ADLOR BOUDREAU, OF OAKLAND, CALIFORNIA.

HOSE-WINDER CLAMP.

Application filed December 1, 1923. Serial No. 678,041.

*To all whom it may concern:*

Be it known that I, ADLOR BOUDREAU, a citizen of the United States, residing at Oakland, in the county of Alameda and State of California, have invented new and useful Improvements in Hose-Winder Clamps, of which the following is a specification.

This invention relates to improvements in clamps and has particular reference to a clamp adapted to hold a nozzle and a portion of the hose so that the same can be wrapped or wound in an efficient and expeditious manner.

A further object of this invention is to construct a clamp in such a manner that it can also be utilized as a stand when it is desired to sprinkle or water a lawn or the like.

An additional object is to produce a device which is simple in construction, economical to manufacture, strong, durable, and positive in operation.

Other objects and advantages will be apparent during the course of the following description.

Figure 2:
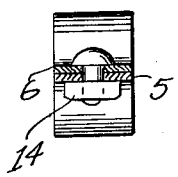
Figure 1:
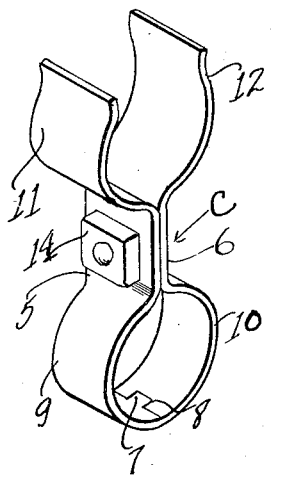
Figure 3:
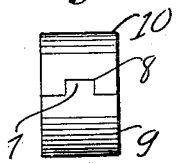
Figure 4:
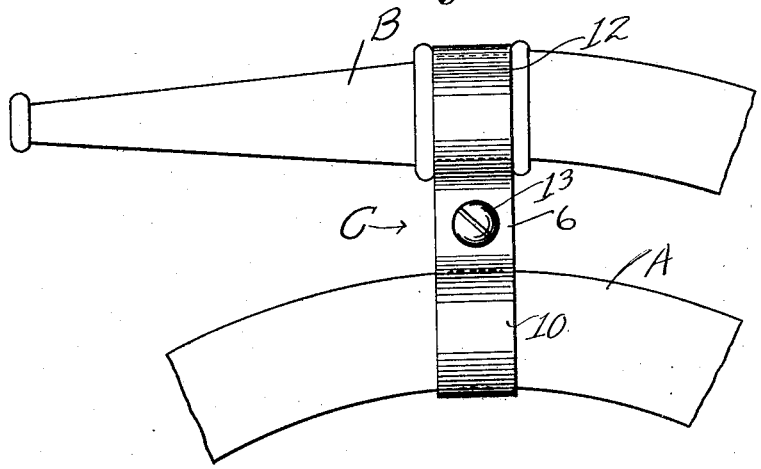

In the accompanying drawings forming a part of this specification and in which like numerals are employed to designate like parts throughout the same, Figure 1 is a perspective view of the device constructed in accordance with my invention, Figure 2 is a horizontal section through the clamp, Figure 3 is a bottom plan view of Figure 2, and Figure 4 is a side elevation of the device showing the same secured to a portion of hose nozzle, a portion of the hose being broken away.

Great inconvenience has been experienced in the winding of a hose, due to the fact that when the winding operation is initiated, the nozzle will invariably, due to its weight, become unwieldy, and prevent a quick and efficient winding of the hose. To overcome this annoyance, I have devised my improved clamp, the body of which can be readily secured to the hose at a point approximately six feet from the nozzle and the fingers of the clamp can be so positioned that they will readily retain the nozzle therein. After the clamp has been thus positioned on the hose, the remainder of the hose can be readily rolled hand over hand so that there will be no danger of the nozzle being accidentally displaced from the clamp and, accordingly, a quick winding of the hose can be accomplished.

In the accompanying drawings wherein for the purpose of illustration is shown a preferred embodiment of my invention, the reference character A designates a hose, which has connected thereto a nozzle B, while the letter C designates as a whole my improved clamp, which is preferably made of spring metal and embodies in its construction body members 5 and 6, which are similar in construction, except that the member 5 is provided at its lower extremity with a lug 7, while the member 6 has formed on its lower extremity a recess 8, the lug and recess serving to form an interlocking clip, which prevents lateral displacement of the lower extremity of the clamp. It will be observed that the curved lower extremity 9 of the member is adapted to contact with the curved lower extremity 10 of the member 6, thus forming a complete ring which is adapted to embrace the hose at a point approximately six feet from the nozzle.

The body portions of the members 5 and 6 are disposed in parallelism and respectively terminate in fingers 11 and 12, between which fingers the nozzle B is received and retained in a locked position with relation to the body of the hose. While the fingers are shown here as disposed between the flanges of the nozzle, nevertheless, it is to be understood that the fingers can embrace the nozzle or any point thereon.

I propose to connect the two members 5 and 6 by a bolt 13 which has mounted thereon a nut 14. The present form of clamp is shown as being of a two-piece construction, nevertheless, it is to be understood that the clamp can likewise consist of a one-piece construction with the curved extremities 9 and 10 being integrally formed and thereby eliminating the interlocking clip.

In practice, the members 9 and 10 are positioned so as to encircle the hose, as above expressed, at a point approximately six feet from its length and the bolt and nut are then employed to secure the body members 5 and 6 together. The fingers 11 and 12 are then so disposed that they can readily receive therebetween the nozzle and retain the same in a fixed position with relation to the hose. After this operation has been completed, the balance of the hose can be readily rolled hand over hand so that an efficient and expeditious winding action can be accomplished.

While the preferred use of this clamp is for the purpose of winding a hose, nevertheless, it will be obvious that the clamp can also be used as a stand when it is desired to sprinkle a lawn or the like with the hose. When using the clamp as a stand it is only necessary to insert the nozzle in the clamp and the hose can be tilted to any position that is desired.

It is to be understood that the form of my invention herewith shown and described is to be taken as a preferred example of the same and that various changes in the shape, size and arrangement of parts may be resorted to without departing from the spirit of the invention or the scope of the subjoined claim.

Having thus described my invention, I claim:—

A clamp of the character described comprising two connected body members terminating respectively in curved extremities, spring fingers, one of said curved extremities being formed with a lug, the other of said curved extremities being formed with a recess to receive said lug, said extremities forming a ring for encircling a portion of the hose and the fingers being adapted to receive and retain the nozzle of the hose.

In testimony whereof I affix my signature.

ADLOR BOUDREAU.